US012628150B2

(12) United States Patent
Mehran et al.

(10) Patent No.: US 12,628,150 B2
(45) Date of Patent: May 12, 2026

(54) NETWORK MANAGEMENT

(71) Applicant: British Telecommunications Public Limited Company, London (GB)

(72) Inventors: Farhad Mehran, London (GB); Richard MacKenzie, London (GB)

(73) Assignee: British Telecommunications Public Limited Company, London (GB)

( * ) Notice: Subject to any disclaimer, the term of this patent is extended or adjusted under 35 U.S.C. 154(b) by 655 days.

(21) Appl. No.: 17/594,352

(22) PCT Filed: Mar. 17, 2020

(86) PCT No.: PCT/EP2020/057282
§ 371 (c)(1),
(2) Date: Oct. 12, 2021

(87) PCT Pub. No.: WO2020/207720
PCT Pub. Date: Oct. 15, 2020

(65) Prior Publication Data
US 2022/0191884 A1     Jun. 16, 2022

(30) Foreign Application Priority Data

Apr. 12, 2019    (EP) ..................................... 19169101

(51) Int. Cl.
*H04W 72/12* (2023.01)
*H04W 56/00* (2009.01)
(52) U.S. Cl.
CPC ....... *H04W 72/12* (2013.01); *H04W 56/0045* (2013.01)
(58) Field of Classification Search
CPC .... H04L 5/003; H04L 47/50; H04W 56/0045; H04W 72/0446; H04W 72/12
See application file for complete search history.

(56) References Cited

U.S. PATENT DOCUMENTS 11,140,695 B1 * 10/2021 Eyuboglu ........... H04W 72/535
2008/0186950 A1   8/2008 Zhu et al.
(Continued)

FOREIGN PATENT DOCUMENTS

CN       108028746 A     5/2018
CN       108713327 A    10/2018
(Continued)

OTHER PUBLICATIONS

Cheng, "A Time Slot Resource Distribution Method and Device Based on Uplink and Downlink Queue Balancing," English Machine Translation of Cheng (CN 108834214 A), Clarivate Analytics, pp. 1-13 (Year: 2024).*

(Continued)

*Primary Examiner* — Thomas R Cairns
*Assistant Examiner* — Kai Chang
(74) *Attorney, Agent, or Firm* — EIP US LLP

(57) ABSTRACT

A method of controlling a telecommunications network, the telecommunications network having a first node, a second node, and a third node, and the method including identifying a first schedule for a frame for facilitating communication between the first node and the second node; identifying a second schedule for a frame for facilitating communication between the second node and the third node, wherein the frames each have an uplink subframe and a downlink subframe; comparing the first and second schedules so as to identify a misalignment in the frames; and applying an adjustment to the first schedule relative to the second schedule so as to reduce the identified misalignment in the frames, thereby to reduce a delay in communication.

24 Claims, 5 Drawing Sheets

(56)                References Cited

U.S. PATENT DOCUMENTS

| | | | | |
|---|---|---|---|---|
| 2013/0322378 A1* | 12/2013 | Guan | ................... | H04W 72/23 |
| | | | | 370/329 |
| 2014/0198737 A1* | 7/2014 | Papasakellariou | .......................... | |
| | | | | H04W 72/0446 |
| | | | | 370/329 |
| 2017/0127363 A1 | 5/2017 | Tamamoto et al. | | |
| 2017/0332401 A1* | 11/2017 | Sun | ................... | H04W 72/0446 |
| 2018/0109307 A1* | 4/2018 | Huang | ............... | H04B 7/06952 |
| 2019/0159155 A1* | 5/2019 | Abedini | ............ | H04W 56/0045 |
| 2019/0222377 A1* | 7/2019 | Liu | ........................... | H04L 5/14 |
| 2019/0289627 A1* | 9/2019 | Blasco Serrano | .... | H04W 56/00 |
| 2019/0357208 A1* | 11/2019 | Liu | ....................... | H04L 5/0092 |
| 2020/0383073 A1* | 12/2020 | Liu | ....................... | H04J 3/0673 |
| 2023/0345553 A1* | 10/2023 | Maya | ............... | H04W 56/0045 |

FOREIGN PATENT DOCUMENTS

| | | | | | |
|---|---|---|---|---|---|
| CN | 108834214 A | * | 11/2018 | ........ | H04W 72/0446 |
| WO | WO2011053214 A1 | | 5/2011 | | |
| WO | WO2017039888 A1 | | 3/2017 | | |
| WO | WO2017195171 A1 | | 11/2017 | | |
| WO | WO2018172136 A1 | | 9/2018 | | |
| WO | WO-2020029777 A1 | * | 2/2020 | ........... | H04L 5/0053 |

OTHER PUBLICATIONS

Chen, "Resource Configuration Method and Apparatus," English Machine Translation of Chen (WO 2020/029777 A1), Clarivate Analytics, pp. 1-31 (Year: 2024).*

GB Combined Search and Exam report GB1905255.4 dated Sep. 24, 2019, 5 pages.

PCT International Search Report for PCT/EP2020/057282 dated Apr. 14, 2020, 13 pages.

International Preliminary Report on Patentability received for PCT Application No. PCT/EP2020/057282, mailed on Oct. 21, 2021, 9 pages.

Office Action received for Chinese Patent Application No. 202080028252.9, mailed on Sep. 26, 2023, 10 pages (English Translation Only).

Office Action received for European Patent Application No. 20710953.9, mailed on Dec. 8, 2023, 6 pages.

Telecom Infra Project , "Creating an ecosystem for vRANs supporting non-ideal fronthaul", 2018, pp. 1-22.

Office Action received for European Patent Application No. 20710953.9, mailed on Jul. 30, 2024, 7 pgs.

Office Action received for European Patent Application No. 20710953.9, mailed on Jan. 14, 2025, 8 pgs.

* cited by examiner

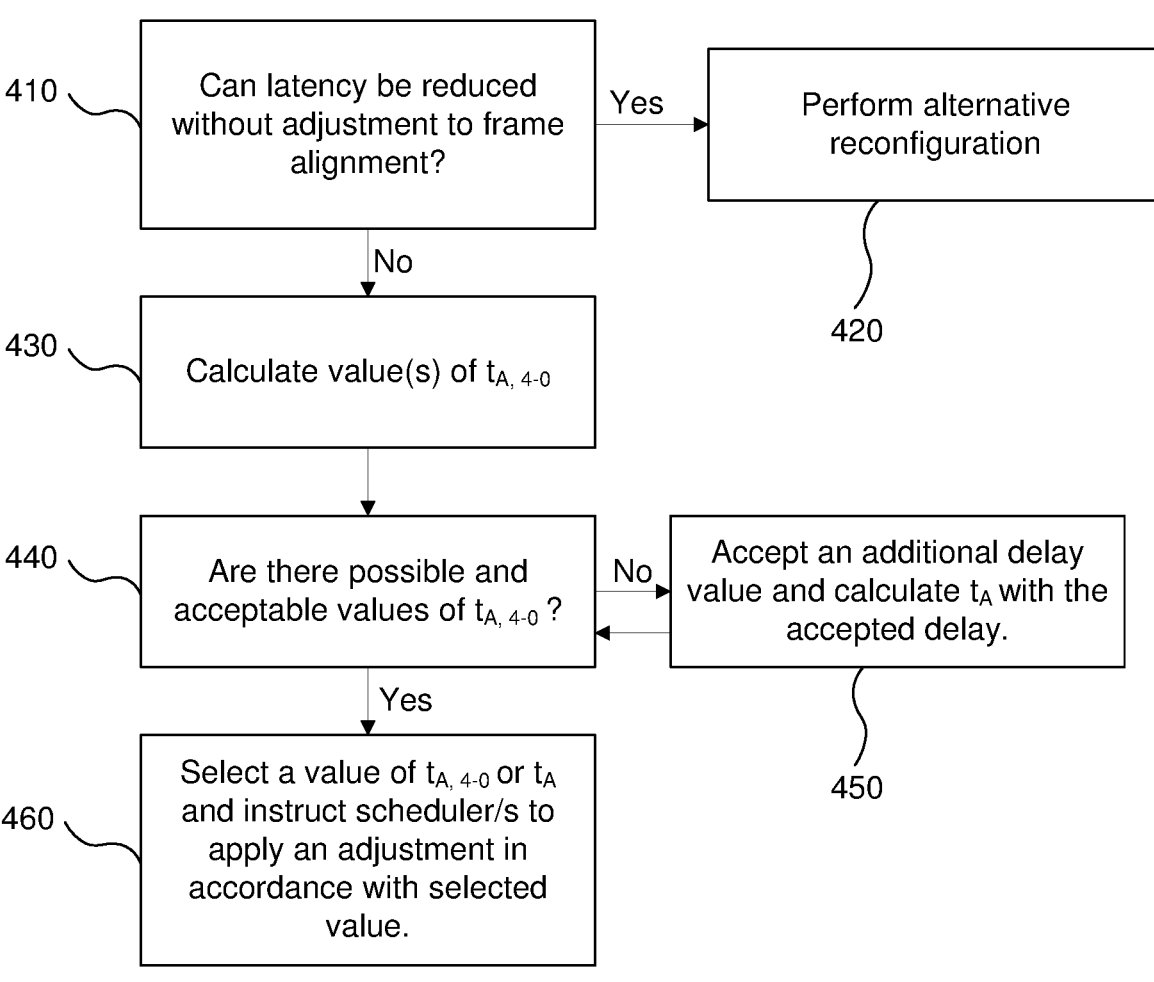

410 — Can latency be reduced without adjustment to frame alignment? → Yes → Perform alternative reconfiguration

420

No

430 — Calculate value(s) of $t_{A, 4\text{-}0}$

440 — Are there possible and acceptable values of $t_{A, 4\text{-}0}$ ? → No → Accept an additional delay value and calculate $t_A$ with the accepted delay.

450

Yes

460 — Select a value of $t_{A, 4\text{-}0}$ or $t_A$ and instruct scheduler/s to apply an adjustment in accordance with selected value.

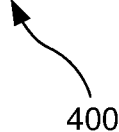

NETWORK MANAGEMENT

PRIORITY CLAIM

The present application is a National Phase entry of PCT Application No. PCT/EP2020/057282, filed Mar. 17, 2020, which claims priority from EP Patent Application No. 19169101.3, filed Apr. 12, 2019, which is hereby fully incorporated herein by reference.

TECHNICAL FIELD

The present disclosure relates to a method of controlling a telecommunications network so as to reduce latency, and to a telecommunications network therefor.

BACKGROUND

Modern cellular networks can support Centralized Radio Access Network (C-RAN)—also referred to as Cloud Radio Access Network and Disaggregated Radio Access Network—architectures in which a base station may be split into a Central Unit (CU) and one or more Distributed Units (DUs). Accordingly, the various protocol layers of the cellular protocol in use are also split between the CU and the DUs such that the DUs may implement the lowermost layer (e.g. the radio frequency layer) and optionally one or more higher layers, and all other higher layers may be implemented in the CU.

However, this functional split between the CU and the DUs may be to the detriment of efficiently and effectively coordinating communication between at least the CU and the DUs, and in particular may cause unnecessary latency.

It is therefore an aim of embodiments of the present disclosure to alleviate the aforementioned problems.

SUMMARY

According to a first aspect of the present disclosure, there is provided: a method of controlling a telecommunications network, the telecommunications network having a first node, a second node and a third node, and the method comprising the steps of: identifying a first schedule for a frame for facilitating communication between the first node and the second node; identifying a second schedule for a frame for facilitating communication between the second node and the third node, wherein the frames each comprise an uplink subframe and a downlink subframe; comparing the first and second schedules so as to identify a misalignment in the frames; and applying an adjustment to the first schedule relative to the second schedule so as to reduce the identified misalignment in the frames, thereby to reduce a delay in communication. In some aspects, the misalignment is a temporal misalignment.

In some aspects, the comparing is performed so as to identify a temporal misalignment. In some aspects, the comparing is performed so as to identify a misalignment in the frames for causing a delay in communication between the first, second and third nodes. In some aspects, identifying the first and/or second schedule includes identifying schedules associated with subframes of the first and/or second frame/s. In some aspects, the comparing is performed so as to identify a misalignment in the subframes.

In some aspects, applying the adjustment to the first schedule relative to the second schedule comprises: adjusting only the first schedule; adjusting only the second schedule; or adjusting the first and the second schedules.

In some aspects, the telecommunications network is a wide area telecommunications network. In some aspects, the telecommunications network is a cellular mobile telephone network. In some aspects, the telecommunications network operates in accordance with a Wi-Fi, 3G, 4G and/or 5G protocol.

In some aspects, the first node, the second node and/or the third node comprises at least two remote entities. In some aspects, an uplink or downlink subframe is a type of subframe. In some aspects, the method further comprises the steps of identifying a third schedule for a frame for facilitating communication between the first node, the second node or the third node and a further node, and wherein the comparing and adjustment is performed in dependence also on the third schedule.

In some aspects, the adjustment is applied so as to align: reference signals; guard periods; synchronization signals; broadcast signals; and/or control signals. In some aspects, wherein the adjustment is a time shift. In some aspects, the time shift is performed by applying a delay to a frame or by advancement of a frame. In some aspects, the delay is applied by adding a subframe. In some aspects, the advancement is applied by removing a subframe.

In some aspects, the adjustment is a change in duration of an uplink and/or downlink subframe. In some aspects, said change in duration is an increase or decrease. In some aspects, the adjustment is an increase or decrease in the symbol period of a subframe. In some aspects, the adjustment is a change in sequence of uplink and downlink subframes. In some aspects, the first and/or the second schedule/s comprise/s timings of uplink and/or downlink subframes.

In some aspects, the first and/or the second schedule/s comprise/s durations of uplink and/or downlink subframes. In some aspects, the adjustment is applied so as to cause coincidence of: an uplink subframe associated with the first schedule and an uplink subframe associated with the second schedule; and/or a downlink subframe associated the first schedule and a downlink subframe associated with the second schedule. In some aspects, the adjustment is applied so as to cause said coincidence throughout (and optionally only throughout) the duration of a communication being communicated between the first node, second node and/or the third node.

In some aspects, the adjustment is applied so as to prevent coincidence, between the frames, of an uplink or a downlink subframe with a non-downlink and a non-uplink subframe, wherein a non-downlink and a non-uplink subframe include: reference signals; guard periods; synchronization signals; broadcast signals; and control signals. In some aspects, the method further comprises the step of determining a minimum latency period for communicating a communication to and/or from the first node, the second node and/or the third node.

In some aspects, the minimum latency period comprises: travel time of a communication; processing time of the communication by the first and/or second node; communicating the, or another, communication, on to a further network location (e.g. the further node); and/or further processing of the, or the other, communication at the further network location. As used herein, the "minimum latency period" may connote a period of time that is required to send and receive (or vice versa) a communication between the first node, the second node and/or the third node excluding delays due to a misalignment in frame structures. Accordingly, the term "minimum" may be used in a relative sense, and may not connote an absolute minimum, nor a static minimum.

In some aspects, at least one minimum latency period is determined for a communication to and/or from the first node, the second node, the third node and/or the further network location. In some aspects, the minimum latency period is predicted or derived from an identity of the first node, the second node and/or the third node.

In some aspects, the communication is a: message; a service request; a data service; a non-data service; a control message; and/or a management message. In some aspects, the communication is: only an uplink message; only a downlink message; an uplink and a downlink message; and/or a plurality of uplink and downlink messages.

In some aspects, the communication originates from the first node, the second node, the third node or a core of the telecommunications network. In some aspects, the adjustment is applied so as to separate: at least a portion of an uplink subframe of the first frame and at least a portion of an uplink subframe of the second frame by no more than the minimum latency period; and/or at least a portion of a downlink subframe of the first frame and at least a portion of a downlink subframe of the second frame by no more than the minimum latency period.

In some aspects, the adjustment is performed so as to separate a point in time when a communication is available to be transmitted (e.g. from the first node, the second node or the third node) and a point in time when the communication is available to be received (e.g. by the first node, the second node or the third node).

In some aspects, wherein the adjustment is applied so that a transition between an uplink and a downlink subframe occur at the same time for the first frame and for the second frame. In some aspects, the method further comprises the step of calculating an adjustment value for applying the adjustment, and wherein the adjustment value is derived in dependence on the minimum latency period.

In some aspects, said adjustment value is also derived in dependence on the duration of an uplink and/or downlink subframe for the first and/or second frame/s. In some aspects, said adjustment value is also derived in dependence on a point in time when transition between an uplink and a downlink subframe occurs for the first and/or second frame/s.

In some aspects, the adjustment is applied so that a point in time when a communication is received by a given node and a point in time when the communication is available to be transmitted by said given node both occur in the same subframe. In this way, the communication may be received by, and may be communicated from, a given node after no more than the minimum latency period. In some aspects, first and the second nodes form part of a split Radio Access Network. In some aspects, the first node, the second node or the third node is in the form of User Equipment, centralized unit and/or a distributed unit. In some aspects, the first node is the UE, the second node is the distributed unit, and the third node is the centralized unit.

In some aspects, the first node and the second node are connected via a wired telecommunications link. In some aspects, the first node, the second node and/or the third node comprise, or consists of, a wired telecommunications link and/or a wireless telecommunications link. In some aspects, the wired telecommunication link operates in accordance with: G.fast; Passive Optical Network; and/or DOCSIS.

In some aspects, the second node and the third node are connected via a wireless telecommunications link. In some aspects, the wireless telecommunication link operates in accordance with: radio; New Radio; microwave; Wi-Fi; 3G; 4G; 5G; Free-Space Optical (FSO) Communication.

In some aspects, the first node is connected to a core of the telecommunications network. In some aspects, the first node is directly connected to a core of the telecommunications network, and may be connected via a wired connection. In some aspects, the first and second frames are time-division duplexed and/or frequency-division duplexed. In some aspects, the first frame and the second frame are heterogeneous or homogenous as to frame channel type.

In some aspects, the first frame and the second frame is a logical, transport or physical channel type frame. In some aspects, the first frame or the second frame has a radio channel type. In some aspects, the method is triggered by the first node, the second node, the third node and/or a core of the telecommunications network. In some aspects, the method is triggered in response to: a communication; a request for a service; a request for a change in a standard of service; and/or a change in a processing load of the telecommunications network.

In some aspects, the communication; the request for a service; the request for a change in a standard of service originates from the first node, the second node, the third node or a core of the telecommunications network. In some aspects, the change in a processing load of the telecommunications network is detected by the first node, the second node, the third node or a core of the telecommunications network.

In some aspects, the request for a service is for a low latency service, and for example a URLLC service. In some aspects, the request for the low latency service originates from the first node, the second node, the third node or a core of the telecommunications network.

As used herein, a low latency service may connote a latency between the first node, the second node and the third node (and in some instances back again) of no more than, for example: 20 ms; 10 ms; 5 ms; 2 ms; 1 ms, 0.5 ms; 0.2 ms; 0.1 ms; or 0.05 ms. In some aspects, the request for a change in a standard of service is a request for a decrease in latency. In some aspects, the method further comprises the step of reverting the applied adjustment so as to revert the identified misalignment.

According to another aspect of the disclosure, there is provided a telecommunications network system comprising: a first node; a second node configured to communicate with the first node and for communicating with a third node; a processor configured to: identify a first schedule for a frame for facilitating communication between the first node and the second node; identify a second schedule for a frame for facilitating communication between the second node and the third node, wherein the frames each comprise an uplink subframe and a downlink subframe; compare the first and second schedules so as to identify a misalignment in the frames for causing a delay in communication between the first, second and third nodes; and a controller configured to apply an adjustment to the first schedule relative to the second schedule so as to reduce the identified misalignment in the frames, thereby to reduce a delay in communication. In some aspects, the processor or the controller is provided as part of the first node, the second node, or a core of a telecommunications network.

The disclosure includes any novel aspects described and/or illustrated herein. The disclosure also extends to methods and/or apparatus substantially as herein described or as illustrated with reference to the accompanying drawings. The disclosure is also provided as a computer program or a computer program product for carrying out any of the methods described herein or for embodying any of the apparatus features described herein, and a computer-readable medium storing thereon a program for carrying out any of the methods and/or for embodying any of the apparatus features described herein. Features described as being implemented in hardware may alternatively be implemented in software, and vice versa.

The disclosure also provides a method of transmitting a signal, and a computer product having an operating system that supports a computer program for performing any of the methods described herein and/or for embodying any of the apparatus features described herein.

Any apparatus feature may also be provided as a corresponding step of a method, and vice versa. As used herein, means plus function features may alternatively be expressed in terms of their corresponding structure, for example as a suitably-programmed processor.

Any feature in one aspect of the disclosure may be applied, in any appropriate combination, to other aspects of the disclosure. Any, some and/or all features in one aspect can be applied to any, some and/or all features in any other aspect, in any appropriate combination. Particular combinations of the various features described and defined in any aspects of the disclosure can be implemented and/or supplied and/or used independently. As used throughout, the word 'or' can be interpreted in the exclusive and/or inclusive sense, unless otherwise specified.

BRIEF DESCRIPTION OF DRAWINGS

The disclosure extends to a method of controlling a telecommunications network and to a telecommunications network as described herein or substantially as illustrated with reference to the accompanying drawings. The present disclosure is now described, purely by way of example, with reference to the accompanying diagrammatic drawings, in which:

FIGS. 3a, 3b and 3c show frames for facilitating communication amongst portions of the telecommunications network; and FIG. 4 is a process diagram of a process for adjusting the frames so as to improve the telecommunications network.

DETAILED DESCRIPTION

Figure 1:
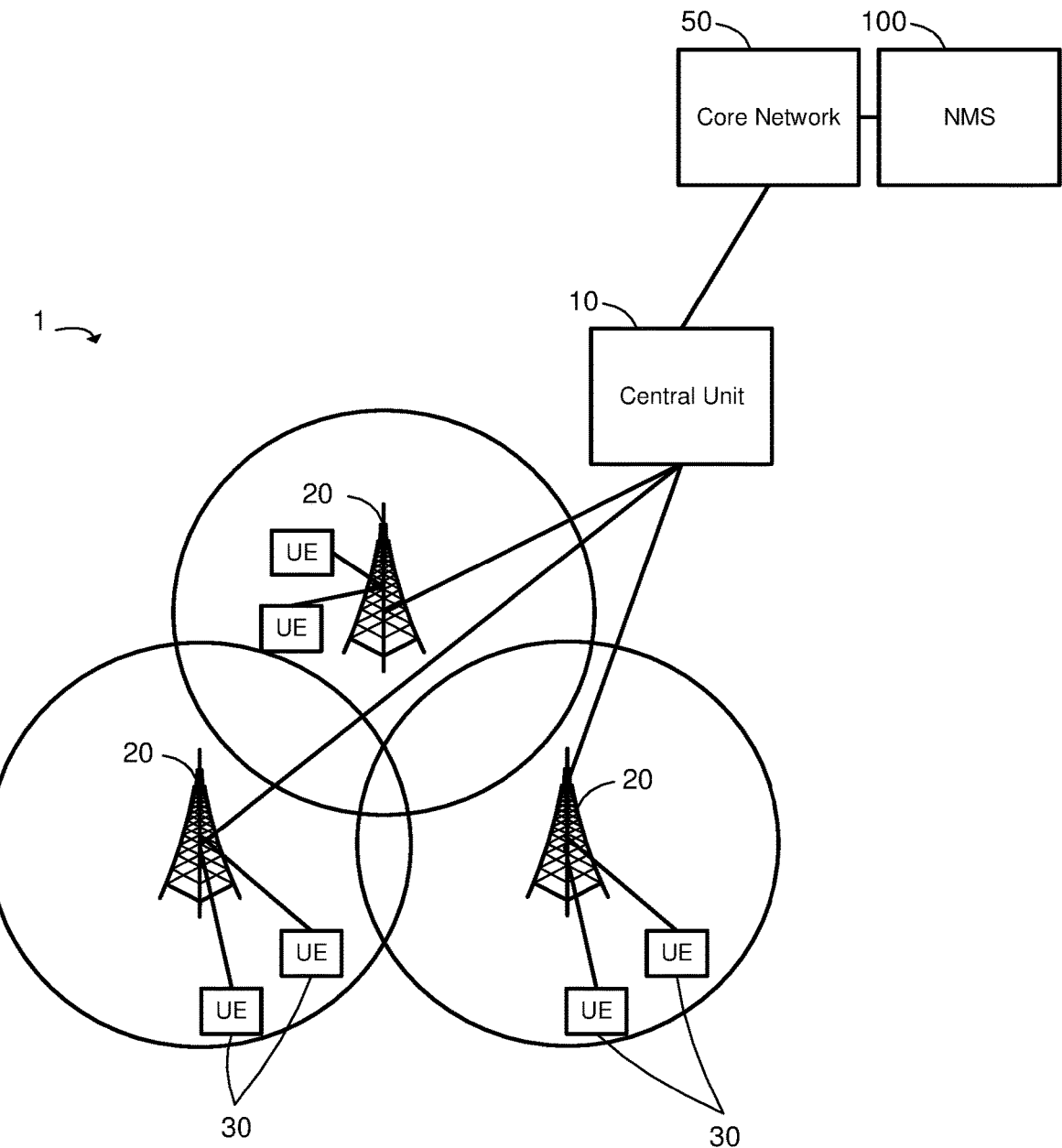
FIGS. 1 and 2 are schematic diagrams of a telecommunications network.

FIG. 1 shows a cellular telecommunications network 1 incorporating a Centralized Radio Access Network (C-RAN)—or a split Radio Access Network (RAN)—architecture having a Central Unit (CU) 10, and a plurality of Distributed Units (DUs) 20. The CU 10 interconnects with each DU 20 and also to a cellular core network 50, which includes or is associated with a Network Management System (NMS) 100.

In turn, User Equipment (UE) 30, for example in the form of a mobile cellular device, is configured to communicate with the DUs 20.

Figure 2:
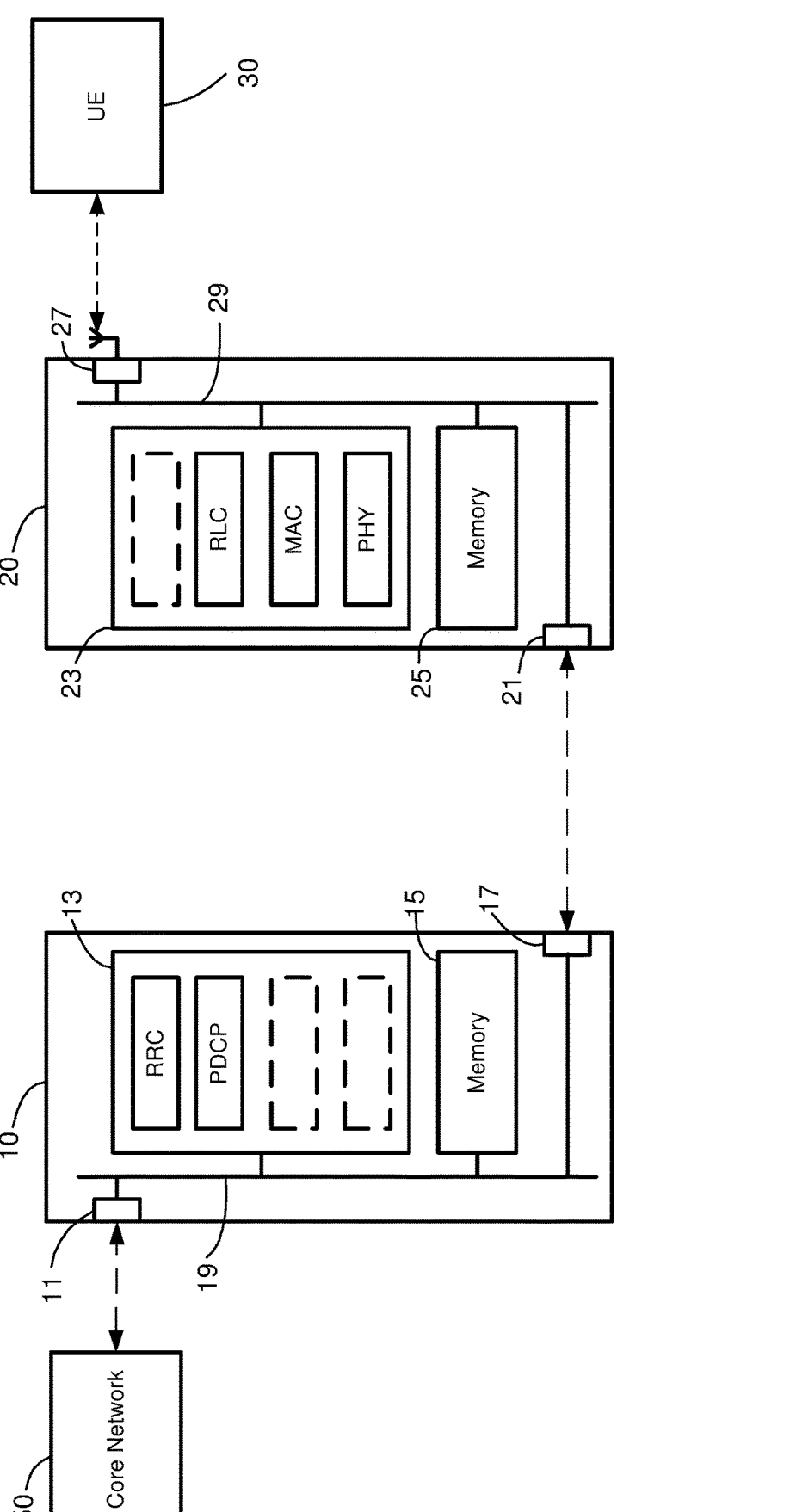

FIG. 2 shows, in more detail, a portion of the telecommunications network 1. The CU 10 comprises a first transceiver 11, a processor 13, memory 15, and a second transceiver 17, all connected via bus 19. The first transceiver 11 is a wired communications interface such that the CU 10 may communicate with the core network 50. The second transceiver 17 is a wired communications interface such that the CU 10 may communicate with the DUs 20.

Each DU 20 comprises a first transceiver 21 for wired communication with the CU 10 (i.e. from the first transceiver 17), a processor 23, memory 25, and a second transceiver 27 for wireless communication with a UE 30, all connected via bus 29.

The processors 13, 23 of the CU 10 and the DUs 20 implement different functions of their operating protocols, such protocols including, for example, G.Fast and LTE for the CU 10 and the DU 20 respectively.

The various functions of the LTE protocol are split between the respective processors 13, 23 of the CU 10 and the DU 20, such that the DU 20 implements lower layer protocols, such as the Radio Link Control (RLC), Medium Access Control (MAC) and Physical (PHY) functions, whereas the CU 10 implements higher layer protocols, such as the Radio Resource Control (RRC) and the Packet Data Convergence Protocol (PDCP) functions.

In turn the CU processor 13 and the DU processor 23 further comprise a fronthaul scheduler and an access scheduler respectively (not shown) for controlling timings of frames for communications to and from each of the DU and the CU.

In one example the link between the CU and DU (i.e. between transceiver 17 and transceiver 21) is a G.Fast connection, in which case Dynamic Resource Allocation (DRA) is utilized so as to effect scheduler coordination. In particular, DRA permits reconfiguration of the schedulers, and for example so as to change the number of symbol periods dedicated to an uplink and a downlink subframe.

The telecommunications network 1 is configured to facilitate connections at various standards of latency, and for example to provide an Ultra-Reliable Low-Latency Connection (URLLC).

Figures 3A, 3B:
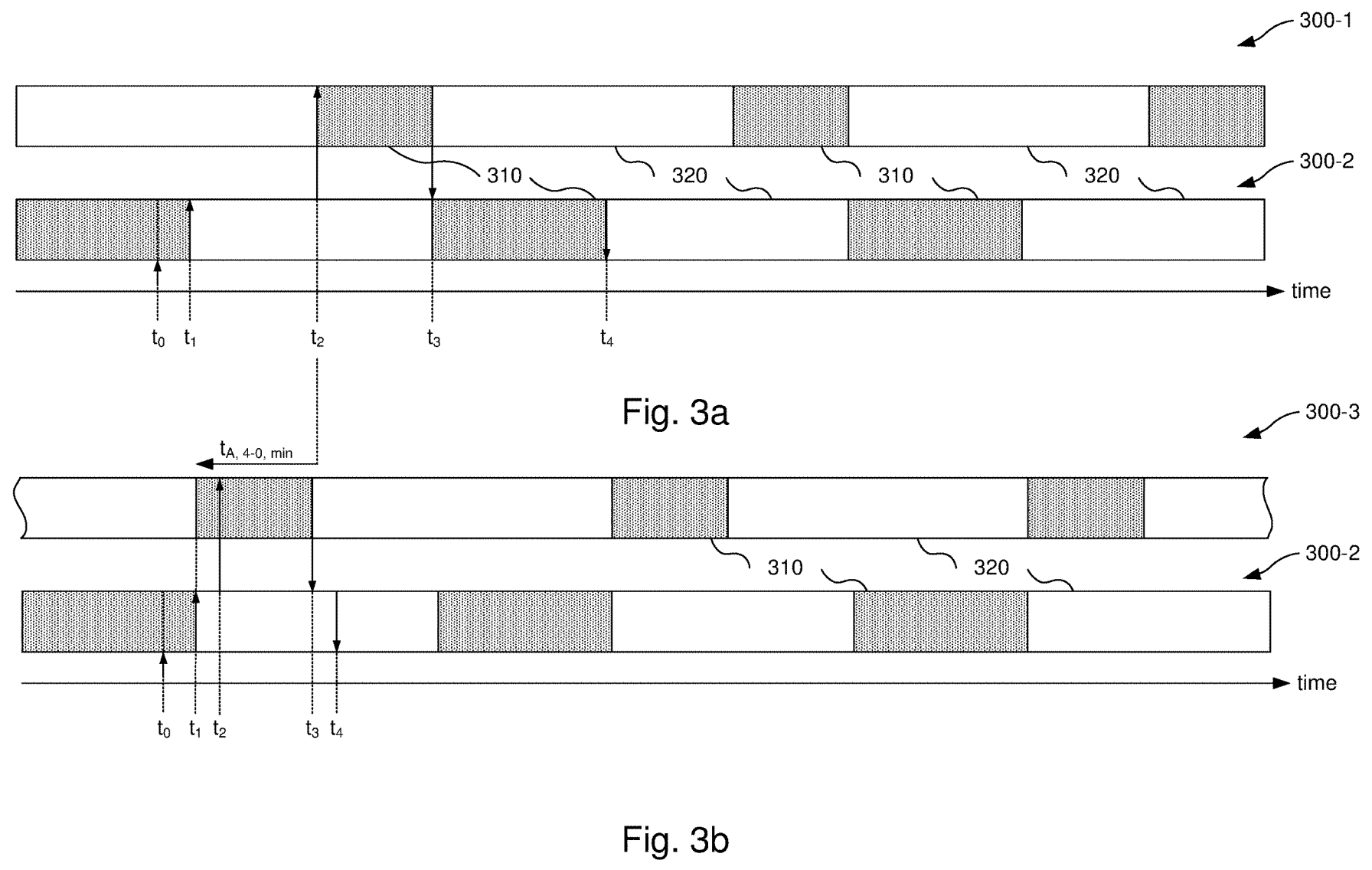
Figure 3C:
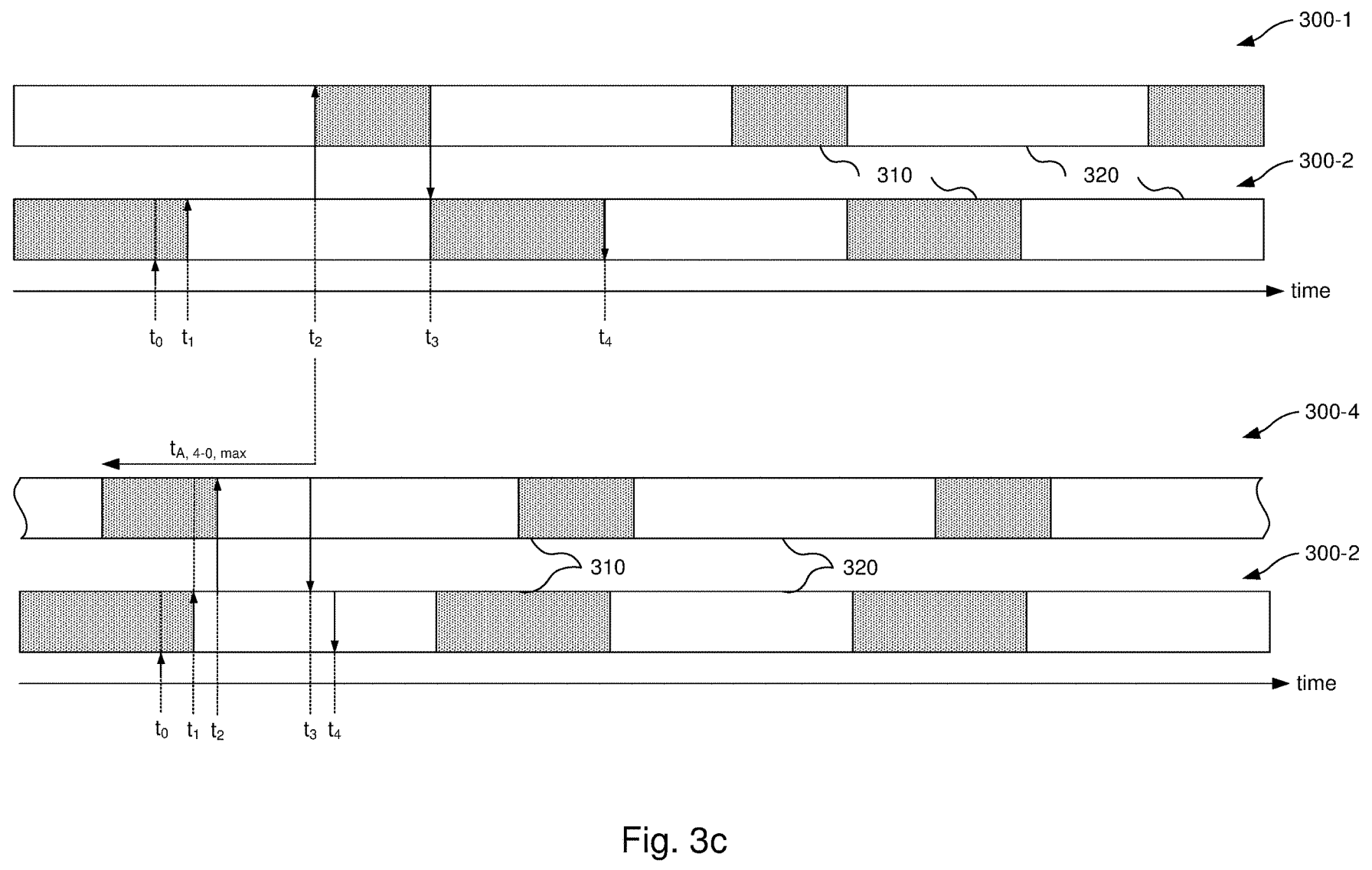

FIGS. 3a, 3b and 3c show frames 300 for facilitating data transmission over the network 1. The frames 300 are structured so as to facilitate uplink and downlink communication using Time-Division Duplex (TDD). Accordingly, the frames 300 comprise subframes in the form of an uplink-type subframe 310 and a downlink-type subframe 320.

In FIG. 3, a pair of frames—a first frame 300-1 and a second frame 300-2—are shown, in which each frame is associated with communication between distinct portions of the network 1, and for example the first frame 300-1 is associated with communications between the CU 10 and the DU 20 (i.e. the link provided by transceiver 17 and transceiver 21), whereas the second frame 300-2 is associated with communications between the DU 20 and the UE 30 (i.e. the link provided by transceiver 27 and a transceiver associated with the UE 30). Accordingly, in the examples of FIG. 3, each of the pair of frames is associated with a different type of protocol layer channel, and in particular the first frame 300-1 facilitates communication at a transport layer, whereas the second frame 300-2 facilitates communication at the radio layer.

Communication between the CU and the DU, and between the DU and the UE, therefore occurs in accordance with the frames 300 (which are controlled by the fronthaul and the access schedulers).

Due to time-division duplexing, for example, an uplink communication from the UE to the CU utilizes an uplink subframe of the second frame 300-2, followed by an uplink subframe of the first frame 300-1. Uplink transmission over the first frame 300-1 can take place only after uplink transmission over the second frame 300-2 has arrived and has been processed by the DU.

Accordingly, misalignment in subframe types between the first and the second frames may cause delays in communications between the UE, DU and CU, which therefore introduces unnecessary latency to the telecommunications network 1.

An example of such misalignment is shown in FIG. 3*a* in relation to a UE-originating communication. In more detail, in FIG. 3*a*, at times:

to a communication (e.g. in the form of a service request, such as for a URLLC service) is generated at the UE 30;

$t_1$ the communication is received by the DU from the UE during an uplink subframe 310 of the second frame 300-2 (shown in FIG. 3*a* as occurring at the very end of this uplink subframe);

$t_2$, the DU having completed processing of the communication, the communication is received by the CU from the DU during an uplink subframe 310 of the first frame 300-1 (shown in FIG. 3*a* as occurring at the very start of this uplink subframe);

$t_3$, the CU having generated a response to the communication (e.g. including processing by further portions of the network, such as the core network), the response is received by the DU from the CU during a downlink subframe 320 of the first frame 300-1 (shown in FIG. 3*a* as occurring at the very start of this downlink subframe); and $t_4$ the response is received by the UE from the DU during a downlink subframe 320 of the second frame 300-2 (shown in FIG. 3*a* as occurring at the very start of this downlink subframe).

The period $t_0$ to $t_1$ comprises, at least, an inherent—minimum—delay ($\Delta t_{min(1-0)}$) owing to propagation time of the communication from the UE to the DU and for processing time for the DU to process the communication.

In FIG. 3*a*, at $t_1$ the second frame 300-2 is at (the end of) an uplink subframe 310; at this same instance the first frame 300-1 is at a downlink subframe 320. Accordingly, the communication that is sent by the UE to the DU cannot immediately be received at $t_1$ by the DU to the CU, not until the first frame 300-1 enters an uplink subframe 310. The period between times $t_1$ and $t_2$ ($\Delta t_{2-1}$) also include an inherent—minimum—delay ($\Delta t_{min(2-1)}$) owing, at least, to propagation time of the communication from the DU to the CU and for processing time for the DU to send the communication to the CU.

The minimum possible time between receiving the communication at the DU from the UE ($t_1$) and receiving the communication at the CU ($t_2$) is therefore $\Delta t_{min(2-1)}$, which may only occur if the first frame 300-1 is in an uplink subframe 310 cycle at $t_1+\Delta t_{min(2-1)}$.

However, in FIG. 3*a*, since the first frame 300-1 is in a downlink subframe 320 at $t_1+\Delta t_{min(2-1)}$, the communication cannot be received by the CU at this instance. Instead, the communication is only received by the CU at time $t_2$, which is later than $t_1+\Delta t_{min(2-1)}$. An additional uplink delay of $t_2-(t_1+\Delta t_{min(2-1)})$ that forms part of $\Delta t_{2-1}$ in the example of FIG. 3*a* is therefore a delay caused due to having to wait for the first frame 300-1 to cycle to its next an uplink subframe 310. Accordingly, In FIG. 3*a*, a delay in communication is caused by misalignment in subframe types between the first and the second frames at $t_1$ and at $t_1+\Delta t_{min(2-1)}$.

The period $t_2$ to $t_3$ ($\Delta t_{3-2}$) also includes an inherent—minimum—delay ($\Delta t_{min(3-2)}$) owing, at least, to propagation time of the communication from the CU to the DU and to processing time for the CU to generate the response (which may include communication with, and processing by, other parts of the network 1, such as the core network 50, for example to process a URLCC request and generate a response). However, in FIG. 3*a*, $\Delta t_{min(3-2)}$ is less than $\Delta t_{3-2}$, and an additional downlink delay in having the CU send the response to the DU is caused by misalignment of the downlink subframe 320 at $t_2+\Delta t_{min(3-2)}$; this additional downlink delay is equal to $t_3-(t_2+\Delta t_{min(3-2)})$.

Furthermore, the response that is received at $t_3$ cannot be received by the UE until the second frame 300-2 is in a downlink subframe 320 cycle. The period between times $t_3$ and $t_4$ ($\Delta t_{4-3}$) also includes an inherent—minimum—delay ($\Delta t_{min(4-3)}$) owing, at least, to propagation time of the communication from the DU to the UE and for processing time for the DU to send the communication to the UE.

In FIG. 3*a*, the response that is received by the DU at $t_3$ is only received by the UE at time $t_4$, which is later than $t_3+\Delta t_{min(4-3)}$. An additional downlink delay of $t_4-(t_3+\Delta t_{min(4-3)})$ that forms part of $\Delta t_{4-3}$ in the example of FIG. 3*a* is caused due to having to wait for the second frame 300-2 to cycle to its next downlink subframe 320 so as to be able to receive the response. Accordingly, in FIG. 3*a*, a further delay in communication is caused by misalignment in subframe types between the first and the second frames at $t_3$ and at $t_3+\Delta t_{min(4-3)}$.

Roundtrip communication time between the UE to the CU and back again (all via the DU) is $\Delta t_{4-0}$. In the example of FIG. 3*a*, $\Delta t_{4-0}$ includes a total delay due to subframe misalignment of $[t_2-(t_1+\Delta t_{min(2-1)}) \ t_3-(t_2+\Delta t_{min(3-2)}) \ t_4-(t_3+\Delta t_{min(4-3)})]$; this delay may be approximately 0.5 ms to 15 ms in the example of FIG. 3*a*, and generally 1 ms to 10 ms.

The telecommunications network 1 is configured, by means of the fronthaul and access schedulers to adjust the first and/or second frames so as affect relative alignment of their subframes in an effort to reduce latency in the example of FIG. 3*a*. To do so, the fronthaul or the access scheduler/s is configured to identify the minimum delay associated with a given communication between the UE, DU and CU (e.g. $\Delta t_{min(1-0)}$) and whether there is a misalignment in subframe type at the point of communication (i.e. $t_1$, $t_1$, $t_3$ and $t_4$) and the minimum delay after such a point (e.g. $t_1+\Delta t_{min(2-1)}$).

Upon identification of such misalignment, the fronthaul and/or access scheduler/s calculate a relative adjustment to apply so as to reduce the additional uplink and/or downlink delay/s; this adjustment is herein referred to as $t_A$.

With reference to FIG. 3*a*, so as to eliminate the additional uplink delay constituent of $\Delta t_{2-1}$, it is intended for an uplink subframe 310 of the first frame 300-1 to commence no later than $t_1+\Delta t_{min(2-1)}$, else (as in the example of FIG. 3*a*) $\Delta t_{2-1}>\Delta t_{min(2-1)}$.

Accordingly, with reference to FIG. 3*a*, so as to minimize any additional uplink delay constituent of $\Delta t_{2-1}$, $t_A$ falls within the bounds of:

greater than or equal to: $t_2-(t_1+\Delta t_{min(2-1)})$, in this case applying an adjustment in the form of a time (or "phase") shift of $-t_A$ to the first frame 300-1 relative to the second frame 300-2 will result in $t_2$ and $t_1+\Delta t_{min(2-1)}$ coinciding, and also with commencement of an uplink subframe 310 cycle of the first frame 300-1; and less than or equal to: $t_2-(t_1+\Delta t_{min(2-1)})+\Delta t_{first\ frame,\ uplink}$, where $\Delta t_{first\ frame,\ uplink}$ is the duration of the uplink subframe 310 of the first frame 300-1, in this case applying an adjustment in the form of a time shift of $-t_A$ to the first frame 300-1 relative to the second frame 300-2 will also result in $t_2$ and $t_1+\Delta t_{min(2-1)}$ coinciding, and also with termination of an uplink subframe 310 cycle of the first frame 300-1.

When $t_A=t_2-\Delta t_{min(2-1)}$ this is the minimum adjustment that may be applied to minimize $\Delta t_{2-1}$, which is hence referred to as $t_A$, min. When $t_A=t_2-(t_1+\Delta t_{min(2-1)})+\Delta t_{first\ frame}$, _uplink_ this is the maximum adjustment that may be applied to minimize $\Delta t_{2-1}$, which is hence referred to as $t_{A,\ max}$.

So as to minimize the additional downlink delay forming part of $\Delta t_{4-3}$ or forming part of $\Delta t_{3-2}$, $t_A$ is calculated in a corresponding manner to that for ($\Delta t_{2-1}$), as is $t_{A,\ max}$ and $t_{A,\ min}$. However, in order to minimize a plurality of ($\Delta t_{2-1}$), ($\Delta t_{3-2}$) and ($\Delta t_{4-3}$), $t_A$ is optimized so as to minimize the appropriate additional delays. For example, in order to minimize $\Delta t_{4-0}$, a value of $t_A$, referred to as $t_{A,\ 4-0}$, is calculated that minimizes ($\Delta t_{2-1}$)+($\Delta t_{3-2}$)+($\Delta t_{4-3}$), so that: $t_2$ coincides with $t_1 + \Delta t_{min(2-1)}$; $t_3$ coincides with $t_2 + \Delta t_{min(3-2)}$; and $t_4$ coincides with $t_3 + \Delta t_{min(4-3)}$. Accordingly, this yields a range of values for $t_{A,\ 4-0}$ bound by a maximum value and a minimum value, referred to as $t_{A,\ 4-0}$, max and $t_{A,\ 4-0}$, min respectively.

It will also be appreciated that, in order to eliminate all additional delays, $t_A$ is calculated so as to avoid transmission or receipt coinciding with resources assigned to higher priority or non-dynamic services, and with non-uplink and non-downlink subframes (by the fronthaul and/or access scheduler/s), such as: reference signals, guard periods, synchronization signals, broadcast signals and control signals.

In more detail, FIG. 3*b* shows, an adjusted first frame 300-3 that is equivalent to the first frame 300-1 of FIG. 3*a* with an adjustment in the form of a time shift of $-t_{A,\ 4-0,\ min}$, applied.

The form of the frames 300 are identical in FIGS. 3*a*, 3*b* and 3*c*, and only a relative time shift has been applied to the first frame 300-1 in FIG. 3*a* so as to yield the adjusted first frame 300-3 of FIG. 3*b* and the adjusted first frame 300-4 of FIG. 3*c*. Likewise, times $t_0$ to $t_4$ carry the same significance in FIGS. 3*a*, 3*b* and 3*c*, and the periods between $t_0$ and $t_1$, $t_1$ and $t_2$, $t_2$ and $t_3$, and $t_3$ and $t_4$ also include the respective inherent—minimum—delays (i.e. $\Delta t_{min(1-0)}$, $\Delta t_{min(2-1)}$, $\Delta t_{min(3-2)}$, and $\Delta t_{min(4-3)}$).

By applying the adjustment of $-t_{A,\ 4-0}$, min to the first frame 300-1, the adjusted first frame 300-3 causes, in comparison to FIG. 3*a*, alignment between subframe types at the instances of transmission and receipt between the adjusted first frame 300-3 and the second frame 300-2. Accordingly, the communications from the UE to the DU that is received at $t_1$ is only received at the CU ($t_2$) at $t_1 + \Delta t_{min(2-1)}$ since the uplink cycle 310 of the adjusted first frame 300-3 coincides with $t_1 + \Delta t_{min(2-1)}$. Similarly, the response from the CU to the DU that is received at $t_3$ is received by the UE ($t_4$) at $t_3 + \Delta t_{min(4-3)}$ for corresponding reasons, and the value of $t_{A,\ 4-0}$, min is derived from the value of $\Delta t_{min(4-3)}$.

In FIG. 3*b*, roundtrip communication time $\Delta t_{4-0}$ occurs without any of the additional downlink and uplink delays due to optimized subframe alignment.

Turning to FIG. 3*c*, as part of which FIG. 3*a* has been reproduced for reference, there is shown an adjusted first frame 300-4, in which an adjustment in the form of a time shift of $-t_{A,\ 4-0}$, max has been applied to the first frame 300-1 so as to yield the adjusted first frame 300-4. As with the example of FIG. 3*b*, this causes alignment between subframes at the instances of transmission and receipt between the adjusted first frame 300-4 and the second frame 300-2.

In one example, tolerance is added to $t_A$ so as to account for variation in inherent minimum delays (i.e. $\Delta t_{min(1-0)}$, $\Delta t_{min(2-1)}$, $\Delta t_{min(3-2)}$, and $\Delta t_{min(4-3)}$), for example due to network load.

In one example, there may be no suitable value of $t_{A,\ 4-0}$. Instead, a value of $t_A$ is calculated that reduces additional delay for a portion of the roundtrip communication, for example to reduce $\Delta t_{3-2}$ and/or $\Delta t_{4-3}$, but not $\Delta t_{2-1}$. In such cases an optimization process is run so as to calculate the optimum reduction in additional delay.

FIG. 4 is a process 400 diagram of a method of controlling the telecommunications network 1 so as to reduce latency by improving subframe alignment between the first and the second frames. In a first step 410, the telecommunications network 1 is instructed (e.g. having received a request from a UE) to provide a low latency service and an assessment is made by the network 1 as to whether the network is configured, and capable of, performing a reconfiguration that causes latency to be reduced for the network communication without having to adjust frame alignment, as described above.

For example, such an alternative adjustment may include higher prioritization of a network communication, reallocating resources on either schedulers and/or allocating additional processing resources. If so, such an appropriate reconfiguration is performed 420, after which the process 400 is available to end or to re-iterate (after a predetermined delay back to step 410), not shown). If not, however, then the network 1 identifies values of $t_{A,\ 4-0}$ 430, as described above.

As described above, there may not be any possible or acceptable values of $t_{A,\ 4-0}$, and so a query is performed at a next step 440 as to whether such appropriate values have been (or may be) calculated. If not, then an additional delay value is accepted, and a value of $t_A$ is calculated so as to achieve no more than the accepted additional delay value 450 and to minimize the additional roundtrip delay to the extent possible. Steps 440 and 450 are available to reiterate until an acceptable value of $t_A$ is calculated.

If, however, an acceptable value of $t_{A,\ 4-0}$ or $t_A$ is calculated, then a specific value of $t_{A,\ 4-0}$ or $t_A$ is selected (for example, any value between $t_{A,\ 4-0}$, min and $t_{A,\ 4-0}$, max) and the fronthaul and/or access scheduler/s is/are instructed to apply an adjustment in accordance with the selected value 460, thereby reduction or eliminating (in the case of $t_{A,\ 4-0}$) the additional delay components of $t_{4-0}$.

Process 400 is available to reiterate (e.g. after a predetermined delay) or to be triggered in response to detecting an event. Such an event that causes triggering of process 400 includes:

reconfiguration of a frame (e.g. a change of frame), other than by adjustment as described above in order to reduce latency;

a request for a service, such as a request for an Ultra-Reliable Low-Latency Connection or reservation of resources for high-priority services (such a request may be singular, or be an increase in overall demand for the service); and/or a new service requirement for low latency is demanded of the network that exceeds the current service requirement of the network (e.g. if maximum acceptable latency is reduced from 5 ms to 3 ms).

In one example, the RAN split of the network 1 is applied in accordance with that defined in 3$^{rd}$ Generation Partnership Project, technical specifications 38.401 and 38.470 (in particular in relation to the F1 Interface), the contents of which are herein incorporated by reference. In another example, the RAN split is configured in accordance with O-RAN (formerly XRAN) technology, which facilitates a lower layer split. In yet another example, the RAN split is configured in accordance with Telecom Infra Project (TIP) vRAN technology, which also facilitates a lower layer split In one example, the first transceiver 11 and/or the second transceiver 27 are available to be wireless or wired transceivers. In one example, the second transceiver 17 and/or the first transceiver 21 and/or the DU are available to be part of the CU or DU respectively or are available to be part of a remote dedicated entity. The second transceiver 17 and/or the first transceiver 21 are also available to be wireless or wired transceivers.

In the examples described above, the radio components are described as operating in accordance with LTE split radio, whereas the fronthaul components are described as operating in accordance with G.Fast. However, the radio and fronthaul components are available to operate in accordance with any appropriate communication protocol. For example, the CU and/or DU are available to operate in accordance with: Wi-Fi; LTE; 3G; 4G; 5G; New Radio (NR); Passive Optical Networks (PON); DOCSIS; Free-Space Optical Communication; and/or a microwave link.

In another example, the telecommunications network is available to be configured using conventional-non-split RAN-radio architecture, and for example where a transport link is formed as part of the backhaul that then connects the radio to the rest of the network.

The examples described above rely on a UE-originating communication (in particular a service request) and UE-bound response. In an embodiment, the process is available to be utilized for purely network-originating and/or network-bound communications (such as originating from or bound to the core network, CU and/or DUs), and/or for any form of communication, including a service request, a data service, a non-data service, a control message and/or a management message. The value of to is available to be calculated in dependence on the origin and/or destination of the communication and/or of the nature of the communication.

In an embodiment, the process of adjusting frames so as to improve the telecommunications network is applied for communications between any pair of nodes of the network, including between the core network and the CU; the CU and the DU; the DU and the UE; and/or for any other links between and/or beyond the aforementioned.

The frames 300 described above and shown in the Figures comprise a single cycle of uplink and downlink subframes, and a particular (and static) ratio of uplink to downlink subframe duration within a given frame and amongst the first and second frames. It will be appreciated that the foregoing principles may still be applied where uplink and downlink cycles comprise multiple uplink and/or downlink subframes, and/or with different (and time-dynamic) ratios of uplink to downlink subframe duration within a given frame and/or amongst the first and second frames.

In the examples of FIG. 3, only the first frame has been adjusted so as to cause relative movement to the second frame. In embodiments, however, only the second frame is adjusted or the first and the second frames are both adjusted (according to a given proportion of $t_4$).

In one example, the aforementioned process is also used, or is alternatively used, so as to align non-uplink and non-downlink subframes (by the fronthaul and/or access scheduler/s), such as: reference signals, guard periods, synchronization synchronization signals, broadcast signals and control signals.

In another example, in addition to, or instead of, an adjustment in the form of a time shift, the duration of a particular subframe (i.e. uplink or downlink) is adjusted and/or the sequence of subframes is adjusted, for example using dynamic subframe ratios.

Due to the cyclicity of frames 300, it will be appreciated that multiples of $t_4$ are also available to be applied based on the periodicity of the uplink and downlink cycles of the frame(s) to which $t_4$ is applied.

In one example, merely reducing, rather than minimizing, $\Delta t_{2\text{-}1}$, $\Delta t_{3\text{-}2}$ and/or $\Delta t_{4\text{-}3}$ is desirable. Accordingly, to is calculated so as to effect a reduction, and indeed any reduction, in the additional delays.

In one example, the transceivers, processor and memory of the CU 10 and/or DU 20 are configured to cooperate to define a Software Defined Networking (SDN) operating environment, allowing the CU 10 and/or DU 20 to reconfigure on demand, thereby to provide any appropriate functional split of their operating protocol(s). Furthermore, the CU 10 and first DU 20 may implement further functions (in which case further functional splits would be possible).

Due to the re-configurability of the functional splits between the CU and the DU, the CU and/or the DU are available to provide the fronthaul scheduler and/or the access scheduler. In one example, the access scheduler is a radio access scheduler.

Each feature disclosed in the description, and (where appropriate) the claims and drawings may be provided independently or in any appropriate combination.

Reference numerals appearing in the claims are by way of illustration only and shall have no limiting effect on the scope of the claims.

The invention claimed is:

1. A method of controlling a telecommunications network, the telecommunications network having a first node, a second node, and a third node, and the method comprising:
   determining a minimum latency period for communicating a communication with a node;
   identifying a first schedule for a first frame for facilitating communication between the first node and the second node;
   identifying a second schedule for a second frame for facilitating communication between the second node and the third node, wherein each of the first frame and the second frame comprises an uplink subframe and a downlink subframe;
   comparing the first schedule and the second schedule so as to identify a non-overlapping misalignment in the first frame and the second frame; and
   applying an adjustment to the first schedule relative to the second schedule so as to reduce the identified misalignment in the first frame and the second frame, thereby to reduce a delay in communication, wherein the adjustment is applied so as to separate:
      at least a first portion of a first uplink subframe of the first frame and at least a second portion of a second uplink subframe of the second frame by no more than the minimum latency period; and
      at least a third portion of a first downlink subframe of the first frame and at least a fourth portion of a second downlink subframe of the second frame by no more than the minimum latency period.

2. The method of claim 1, wherein the adjustment is a time shift.

3. The method of claim 1, wherein the adjustment is a change in duration of a subframe.

4. The method of claim 1, wherein the adjustment is a change in sequence of two or more subframes.

5. The method of claim 1, wherein at least one of the first schedule or the second schedule comprises timings of subframes.

6. The method of claim 1, wherein at least one of the first schedule or the second schedule comprises durations of subframes.

7. The method of claim 1, wherein the communication comprises at least one of: a message; a service request; a data service; a non-data service; a control message; and a management message.

8. The method of claim 1, wherein the communication originates from one of: the first node, the second node, the third node, and a core of the telecommunications network.

9. The method of claim 1, further comprising calculating an adjustment value for applying the adjustment, wherein the adjustment value is derived dependent on the minimum latency period.

10. The method of claim 1, wherein the adjustment is applied so that a first point in time when a communication is received by a particular node and a second point in time when the communication is available to be transmitted by the particular node both occur in the same subframe.

11. The method of claim 1, wherein the first node and the second node form part of a split Radio Access Network.

12. The method of claim 1, wherein at least one of the first node, the second node or a third node comprises one of: User Equipment, a centralized unit and a distributed unit.

13. The method of claim 1, wherein the first node and second node are connected via a wired telecommunications link.

14. The method of claim 1, wherein the second node and a third node are connected via a wireless telecommunications link.

15. The method of claim 1, wherein the first node is connected to a core of the telecommunications network.

16. The method of claim 1, wherein the first frame and the second frame are time-division duplexed.

17. The method of claim 1, wherein the first frame and the second frame are frequency-division duplexed.

18. The method of claim 1, wherein the first frame and second frame are heterogeneous as to frame channel type.

19. The method of claim 1, wherein the first frame and second frame each comprise one of: a logical channel type frame, a transport channel type frame, and a physical channel type frame.

20. The method of claim 1, wherein the method is triggered by one or more selected of: the first node, the second node, the third node, and a core of the telecommunications network.

21. The method of claim 1, wherein the method is triggered in response to one or more of: a communication;

a request for a service; a request for a change in a standard of service; and a change in a processing load of the telecommunications network.

22. The method of claim 1, further comprising reverting the applied adjustment so as to revert the identified misalignment.

23. A non-transitory computer-readable storage medium comprising instructions that, when executed by a processor associated with a telecommunications network, causes the telecommunications network to perform the method according to claim 1.

24. A telecommunications network system comprising:
a first node;
a second node configured to communicate with the first node and for communicating with a third node;
a processor configured to:
   determine a minimum latency period for communicating a communication with a node;
   identify a first schedule for a first frame for facilitating communication between the first node and the second node;
   identify a second schedule for a second frame for facilitating communication between the second node and the third node, wherein each of the first and second frames comprises an uplink subframe and a downlink subframe; and
   compare the first and second schedules so as to identify a non-overlapping misalignment in the first and second frames; and
a controller configured to apply an adjustment to the first schedule relative to the second schedule so as to reduce the identified misalignment in the frames, thereby to reduce a delay in communication, wherein the adjustment is applied so as to separate:
   at least a first portion of a first uplink subframe of the first frame and at least a second portion of a second uplink subframe of the second frame by no more than the minimum latency period; and
   at least a third portion of a first downlink subframe of the first frame and at least a fourth portion of a second downlink subframe of the second frame by no more than the minimum latency period.

* * * * *